United States Patent
White

[15] 3,665,985
[45] May 30, 1972

[54] TREE HARVESTING APPARATUS

[72] Inventor: Idas B. White, Blountstown, Fla.

[73] Assignee: Eaton Yale & Towne Canada Limited, London, Ontario, Canada

[22] Filed: June 29, 1970

[21] Appl. No.: 50,593

[52] U.S. Cl. .................................................. 144/34 E
[51] Int. Cl. ........................................... A01g 23/02
[58] Field of Search .............. 144/2 Z, 3 D, 34 R, 34 E, 34 F, 144/309 AC

[56] References Cited

UNITED STATES PATENTS

| | | | |
|---|---|---|---|
| 3,382,899 | 5/1968 | White | 144/34 E |
| 3,468,352 | 9/1969 | Larson et al. | 144/3 D |
| 3,487,864 | 1/1970 | Larson et al. | 144/34 R |
| 3,531,235 | 9/1970 | Boyd et al. | 144/34 E |

Primary Examiner—Gerald A. Dost
Attorney—Yount and Tarolli

[57] ABSTRACT

An improved tree harvesting apparatus is adapted to be mounted on a vehicle and includes a shear assembly for severing a tree. A grapple is mounted on a common base with the shear assembly and is selectively operable to grip a severed or felled tree. A single set of positioning cylinders is selectively operable to move both the shear assembly and grapple relative to the ground to facilitate positioning them in a desired relationship with a tree which is to be either severed or gripped. Another set of positioning cylinders is selectively operable to raise both the shear assembly and grapple to a nonoperating or over-the-road position.

7 Claims, 3 Drawing Figures

Patented May 30, 1972

INVENTOR
IDAS B. WHITE
BY Yount and Tarolli
ATTORNEYS

Patented May 30, 1972

INVENTOR
IDAS B. WHITE
BY Yount and Tarolli
ATTORNEYS

TREE HARVESTING APPARATUS

The present invention relates generally to a tree harvesting apparatus and more particularly to a combination tree shear and grapple.

It is an object of this invention to provide a new and improved tree harvesting apparatus which includes a tree shear which is mounted on a common base with a grapple for gripping a tree severed by the shear.

Another object of this invention is to provide a new and improved tree harvesting apparatus which is compact and includes a tree shear and grapple wherein the same piston and cylinder arrangement is selectively operable to position the shear relative to a tree to be severed and to position the grapple relative to a severed tree which is to be gripped.

Another object of this invention is to provide a new and improved tree harvesting apparatus which includes a shear assembly having a blade which is moved upon operation of an actuator to sever a tree and a grapple which is mounted on a common base with the shear and includes an actuator for effecting pivotal movement of a gripper arm to grip a tree severed by operation of the shear.

These and other objects and features of the invention will become more apparent upon a consideration of the following description taken in connection with the accompanying drawings wherein.

Figure 1:
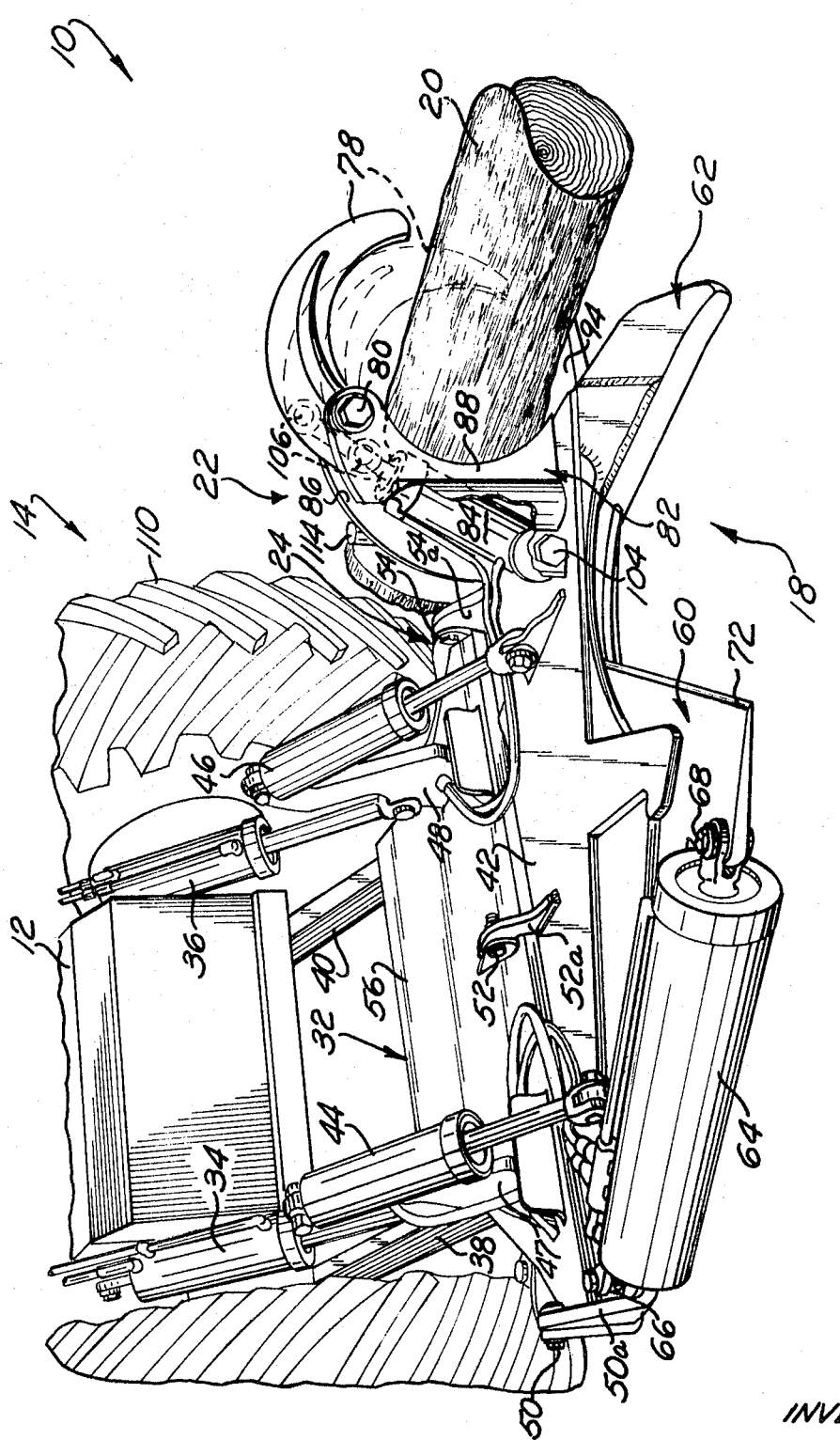
FIG. 1 is a partially broken away pictorial view of a tree harvesting apparatus constructed in accordance with the present invention.

A tree harvesting apparatus 10 constructed in accordance with the present invention is illustrated in FIG. 1 in association with a rear section 12 of a known type of articulated vehicle 14. Although the tree harvesting apparatus 10 is advantageously mounted on the rear of a vehicle, it is contemplated that the tree harvesting apparatus could, if desired, be mounted on the front of the associated vehicle. The tree harvesting apparatus 10 includes a tree shear mechanism 18 for severing or felling standing trees. A severed tree 20 is gripped by a grapple 22 which is mounted on a common base assembly 24 with the shear mechanism 18. Once the severed tree 20 has been gripped by grapple 22, the vehicle 14 can be driven to skid or drag the tree 20 to a suitable location for further processing.

Figure 2:
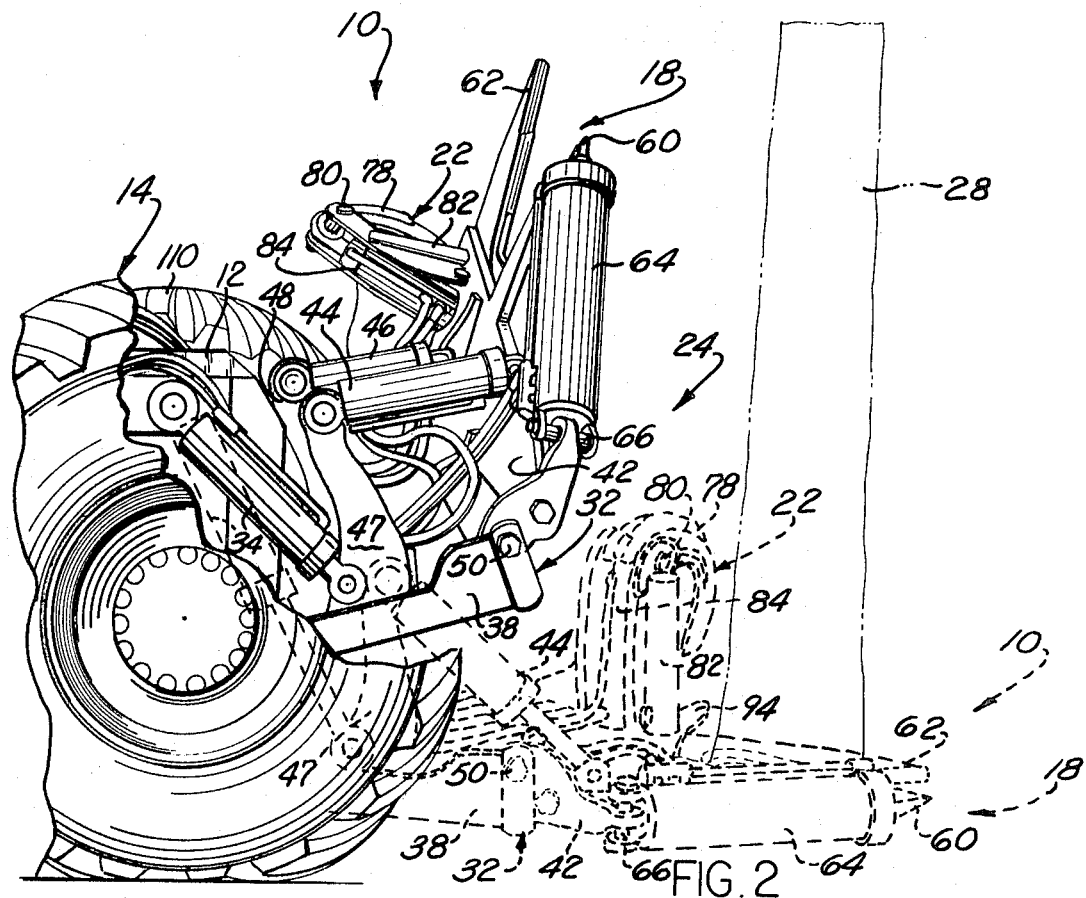
FIG. 2 is an elevational view illustrating the tree harvesting apparatus of FIG. 1 in a nonoperating or over-the-road position and, in dashed lines, in an operating position.

It is contemplated that the vehicle 14 will be driven to a work location with the tree harvesting apparatus 10 in the nonoperating or over-the-road position illustrated in solid lines in FIG. 2. When the tree harvesting apparatus 10 is in this position, the shear mechanism 18 and grapple 22 are in a raised and inwardly retracted position closely adjacent to the rear section 12 of the articulated vehicle 14. This facilitates driving the vehicle over rough roads and through wooded country without snagging or bumping the tree harvesting apparatus 10 with trees, stumps or other objects.

Once the vehicle has been driven to a work location at which a standing tree 28 is to be severed, a support frame 32 of the base assembly 24 is lowered by extending positioning cylinders 34 and 36 (see FIGS. 1 and 2). Extending the positioning cylinders 34 and 36 pivots parallel support arms 38 and 40 from the nonoperating position shown in solid lines in FIG. 2 to the lowered position shown in dashed lines in FIG. 2 and in solid lines in FIG. 1. It should be noted that operation of a single set of hydraulic piston and cylinder assemblies 34 and 36 results in both the tree shear 18 and the grapple 22 being lowered from the nonoperating or over-the-road position.

Once the support frame 32 has been lowered to the operating position of FIG. 1, a base section 42 is pivoted to a desired operating relationship with the standing tree 28 by extending piston and cylinder assemblies 44 and 46 from the retracted condition shown in solid lines in FIG. 2 to the extended condition shown in FIG. 1. The rearward or rod ends of the piston and cylinder assemblies 44 and 46 are pivotally connected to the base section 42. The forward or cylinder ends of the piston and cylinder assemblies 44 and 46 are pivotally connected to upwardly projecting support posts 47 and 48. Therefore, extending or retracting the piston and cylinder assemblies 44 and 46 results in the base 42 being pivoted about connections 50, 52 and 54 relative to the support frame 32. The posts 47 and 48 are fixedly connected to a platform 56 extending between the arms 38 and 40.

Figure 3:
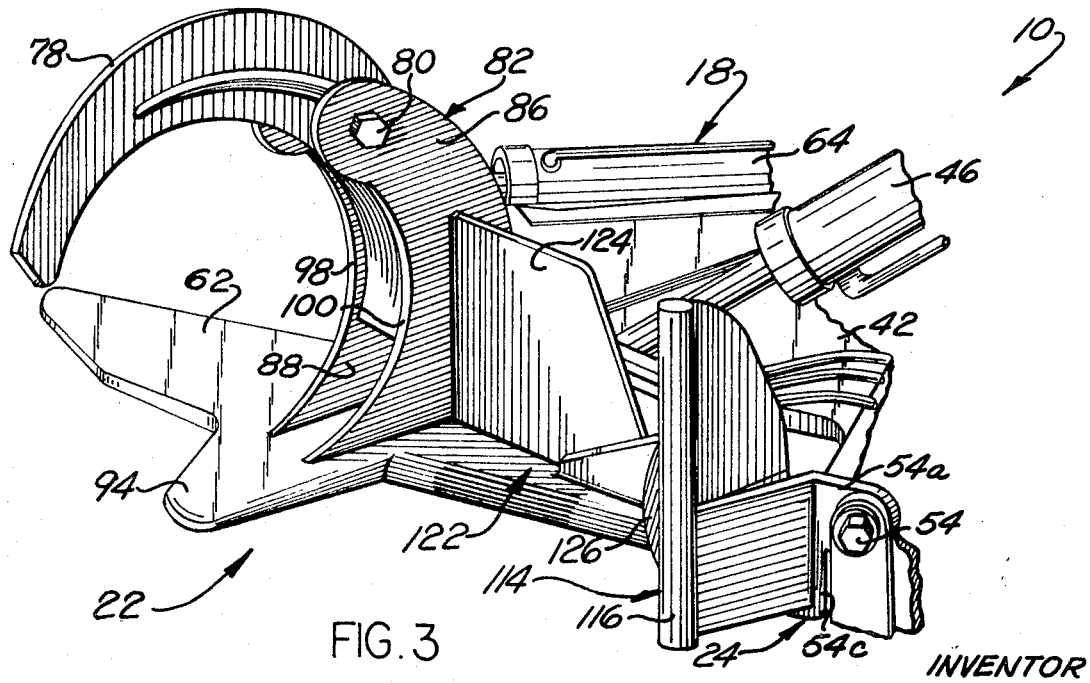
FIG. 3 is an enlarged fragmentary view illustrating the relationship between a grapple and shear mechanism of the tree harvesting apparatus.

Connections 50, 52 and 54 comprise stop type hinges. The hinges 50, 52 and 54 include hinge brackets 50a, 52a, 54a welded to the base section 42. These brackets have a heel portion which engages the platform 56 when the piston and cylinder assemblies 44 and 46 are extended. The heel portion 54c of the bracket 54a is shown in FIG. 3. As a result, the frame 56 and shear are a solid link, and the load is at least in part supported by the platform 56, thereby relieving the load carried by cylinders 44, 46. The cylinders 44, 46 can be locked in their extended position and the larger cylinders 34, 36 used to pivot the entire unit, as desired.

The tree shear mechanism 18 and grapple 22 can be positioned in a desired relationship with a tree to be operated on in hilly or rough country by merely effecting the proper operation of the piston and cylinder assemblies 34, 36, 44 and 46. Thus, the platform section 56 of the support frame 32 can be positioned at different levels relative to the ground by merely extending or retracting the piston and cylinder assemblies 34 and 36. Once the support frame 32 has been located in a desired relationship with the ground, the positions of the tree shear 18 and grapple 22 can be adjusted relative to the ground by merely extending or retracting the positioning cylinders 44 and 46. This enables the base section 42 upon which the tree shear mechanism 18 and grapple 22 are mounted to be angled either upwardly or downwardly relative to the support platform 56 by pivoting the base section about the connections 50, 52 and 54. The limit of upward movement of the base section 42 is determined by the stroke of the cylinders 44, 46, and the limit of downward movement is determined by the engagement of the heel portion of brackets 50a, 52a, 54a with the platform 56. Since the same piston and cylinder assemblies 34, 36, 44 and 46 are utilized to position both the tree shear mechanism 18 and grapple 22, the tree harvesting apparatus 10 can be mounted in a compact relationship with the vehicle 14.

A tree shear mechanism 18 is mounted on the base 42 with the grapple 22 and includes a movable blade 60 which cooperates with a fixed blade or anvil 62 to sever or fell a standing tree 28. To sever a standing tree, the shear mechanism 18 is actuated by extending a piston and cylinder assembly 64 which is pivotally connected at 66 to the base 42 and at 68 to the movable blade 60. The movable blade 60 is also pivotally connected to the base 42. Therefore, extending the piston and cylinder assembly 64 results in the movable blade 60 being pivoted toward the fixed blade or anvil 62. As the movable blade 60 approaches the fixed blade 62, a cutting edge 72 on the movable blade 60 is forced through the trunk of the standing tree to thereby sever the tree. The general construction and operation of the tree shear mechanism 18 is known per se and described my U.S. Pat. No. 3,382,899.

Once the tree has been felled or severed by operation of the shear mechanism 18, it is frequently necessary to drag or skid the tree to a location some distance from the place where the tree was felled. To accomplish this, the grapple 22 is operated to securely grip a trunk of the felled tree. The tree is then skidded or dragged to the distant location by driving the vehicle. When required by roughness of the terrain or other considerations, the shear mechanism 18 can be raised slightly above the ground by selectively operating the piston and cylinder assemblies 34, 36, 44 and 46. Of course, this also raises the grapple 22 so that a trunk of the tree gripped by the grapple is angled upwardly to facilitate skidding or dragging of the tree.

The grapple 22 includes a gripper arm 78 (see FIGS. 1 and 3) which is pivotal to an open or release position, illustrated in solid lines in FIG. 1, in which the grapple is movable into engagement with a felled or severed tree 20 and a closed or gripping position, illustrated in dashed lines in FIG. 1, in which the grapple 22 securely grips the tree. In the illustrated embodiment of the invention, the gripper arm 78 is pivotally mounted at 80 on an upstanding support post 82 which is fixedly connected to the base 42. A piston and cylinder assembly 84 is mounted between opposite side sections 86 and 88 of the support post 82. This enables the side sections 86 and 88 of the support post 82 to shield the piston and cylinder assembly 84 against engagement with the limbs or trunk of a fallen tree.

Once a tree has been severed or felled by operation of the shear mechanism 18, the vehicle 14 is moved rearwardly along one side of the trunk of the fallen tree 20. The tree harvesting apparatus 10 is then moved sidewardly toward the trunk of the tree by pivoting the vehicle 14. This results in an outwardly projecting tongue or support section 94 (see FIG. 3) being forced or cammed under the trunk of the tree 20. The support tongue is fixedly connected with the base section 42 and assists the operator in engaging the tree. Simultaneously with this engagement of the tree with the tongue 94, the piston and cylinder assembly 84 is extended to pivot the gripper arm 78 from the open or release position shown in solid lines of FIG. 1 toward the closed or gripping position shown in dashed lines at FIG. 1. This movement of the gripper arm 78 causes the trunk of the tree 20 to be pulled inwardly against arcuate gripping edges 98 and 100 (FIG. 3) formed on the side sections 86 and 88 of the support post 82. The tree is then securely gripped between the support post 82 and the gripper arm 78. Of course, the tongue 94 will assist in supporting the gripped tree.

The piston and cylinder assembly 84 for moving the gripper arm 78 between the open and gripping positions, is pivotally connected at 104 (FIG. 1) with the base section 42. The rod end of the piston and cylinder assembly 84 is pivotally connected at 106 with the gripper arm 78. Therefore, upon operation of the piston and cylinder assembly 84 from the retracted condition shown in solid lines at FIG. 1 to the extended condition, shown in dashed lines in FIG. 1, the gripper arm 78 is pivoted about the connection 80 as the piston and cylinder assembly 84 is extended.

The trunk of a tree which is gripped by the grapple 22 extends forwardly along the side of the vehicle 14. If the trunk of the tree was angled forwardly and inwardly, the tree would engage a rear wheel 110 (FIG. 1) of the vehicle and would tend to be vibrated or shaken loose from the grapple 22 as the vehicle 14 is driven to skid the tree along the ground. To prevent this from happening, the tree is angled slightly outwardly away from the wheel 110 of the vehicle by a stop or positioning section 114 (FIG. 3) which is fixedly mounted on the base 42. The positioning member 114 includes a stop bar 116 which is located outwardly, in a sideward direction, of the edges 98 and 100 of the support post 82. Therefore, when the trunk of the tree is moved into engagement with the edges 98 and 100 of the support post 82, the tree trunk also engages the stop bar 116 and is angled slightly outwardly of the vehicle to provide clearance for the wheel 110.

When the grapple 22 is being moved into engagement with the severed tree 20, the severed or butt end of the tree may be disposed at such an angle that the tree harvesting apparatus 10 is moved sidewardly and rearwardly toward the end of the tree. If this occurs, the end of the tree could tend to enter between the grapple of 22 and the positioning member 114. To prevent this from occurring, a deflector plate arrangement 122 is provided between the grapple 22 and the positioning member 114 (see FIG. 3). The deflector plate arrangement 122 includes a shield or guard plate 124 which is fixedly connected to the support post 82 and the base 42. The shield plate 124 prevents the end of the tree from sliding between the support post 82 and the positioning member 114 onto the base 42. A cam plate arrangement 126 is angled rearwardly toward the shield plate 124 and is connected with the shield plate in such a manner that the end of the tree will be cammed or pivoted outwardly by engagement with the plate 126 to position the tree for engagement by the stop bar 116. Continued movement of the tree harvesting apparatus toward the tree will then result in the tree being swung into the desired relationship with the grapple 22 and with the wheel 110 of the vehicle 14.

When the felled or severed tree 20 has been skidded or dragged to a location where it is to be released, the piston and cylinder assembly 84 is retracted and the gripper arm 78 is pivoted upwardly to the position shown in solid lines in FIG. 1 to release the tree 20. The positioning member 114 is then utilized to kick or swing the tree outwardly away from the grapple 22. This is accomplished by pivoting the vehicle 14 in such a manner that the grapple 22 is moved sidewardly away from the tree and the stop bar 116 pushes or throws the tree outwardly away from the grapple 22.

In the illustrated embodiment of the invention, the grapple 22 includes only a single gripper arm 78 which is pivotal relative to the base 42. However, it is contemplated that the grapple 22 could include a pair of pivotally mounted gripper arm which would be capable of oscillating relative to the base 42. In addition, it is also contemplated that the tree harvesting apparatus 10 could be mounted on the front of a vehicle rather than the rear of the vehicle as shown in the illustrated embodiment of the invention.

From the foregoing description, it could be seen that the tree harvesting apparatus 10 includes a tree shear 18 for severing a standing tree. A grapple 22 is mounted on a common base with the shear 18 and is operable to grip a tree severed by the shear. The tree shear 18 and grapple 22 are both positioned relative to the ground and a tree to be operated on by the same piston and cylinder assemblies 34, 36, 44 and 46.

Having described a specific preferred embodiment of the invention the following is claimed:

1. Tree harvesting apparatus for use in association with a vehicle, said apparatus comprising a base assembly adapted to be connected to the vehicle, shear means mounted on said base assembly for severing trees, said shear means including at least one movable blade connected to said base assembly and shear actuator means for moving said blade relative to said base assembly to sever a tree, grappler means mounted on said base assembly for gripping a tree severed by said shear means, said grappler means including a gripper arm mounted for pivoting movement relative to said base assembly between a release position and a gripping position and grappler actuator means for pivoting said gripper arm relative to said base assembly from the release position to the gripping position to grip a tree severed by operation of said shear means, and a positioning member fixedly connected to said base assembly at a location between said grappler means and the vehicle for engaging a trunk of a severed tree to position the tree trunk in such an angular relationship with said base assembly so that the tree trunk extends alongside the vehicle in a spaced apart relationship with the vehicle.

2. Tree harvesting apparatus as set forth in claim 1 further including piston and cylinder means for pivoting said base assembly relative to the vehicle to move said shear means and said grappler means relative to the vehicle between an operating position and a nonoperating position.

3. Tree harvesting apparatus as set forth in claim 1 wherein said grappler means includes outwardly extending support means fixedly connected to said base assembly for supporting said gripper arm for pivoting movement between the release and gripping positions, said support means including first and second spaced side sections, said grappler actuator means being mounted intermediate said side sections thereby providing protection for said grappler actuator means against engagement with a tree severed by said shear means.

4. Tree harvesting apparatus as set forth in claim 3 wherein said grappler actuator means includes piston and cylinder means operatively connected with said base assembly and said gripper arm, said piston and cylinder means being extendable and retractable to effect pivoting movement of said gripper arm relative to said base assembly.

5. Tree harvesting apparatus as set forth in claim 1 wherein said base assembly includes an outwardly projecting portion located beneath said gripper arm for at least partially supporting a severed tree gripped by said grappler means.

6. Tree harvesting apparatus as set forth in claim 1 wherein said shear actuator means includes piston and cylinder means operatively connected with said base and with said movable blade, said piston and cylinder means being extendable and retractable to effect pivoting movement of said blade relative to said base assembly independently of pivoting movement of said gripper arm relative to said base assembly.

7. Tree harvesting apparatus as set forth in claim 1 further including deflector means fixedly connected with said base for engaging an end portion of the tree and deflecting the end portion of the tree toward said positioning member.

* * * * *